United States Patent [19]

Carson

[11] 4,162,150

[45] Jul. 24, 1979

[54] APPARATUS FOR SEPARATING WATER AND STEAM IN A NUCLEAR STEAM GENERATOR

[75] Inventor: William R. Carson, Chattanooga, Tenn.

[73] Assignee: Combustion Engineering, Inc., Windsor, Conn.

[21] Appl. No.: 852,271

[22] Filed: Nov. 17, 1977

[51] Int. Cl.² ............... F22B 37/26; B01D 53/26
[52] U.S. Cl. ........................... 55/337; 55/348; 55/424; 55/452; 55/455; 55/DIG. 23; 122/492
[58] Field of Search ............... 55/337, 452, 456, 424, 55/DIG. 23, 348, 455; 122/488–492

[56] References Cited
U.S. PATENT DOCUMENTS

| | | | |
|---|---|---|---|
| 2,648,397 | 8/1953 | Rauese et al. | 55/DIG. 23 |
| 3,066,088 | 11/1962 | Blaser | 122/491 |
| 3,086,343 | 4/1963 | Stern | 55/456 |
| 3,614,863 | 10/1971 | Patterson et al. | 55/452 |
| 3,735,569 | 5/1973 | Micheller et al. | 55/452 |

*Primary Examiner*—Bernard Nozick
*Assistant Examiner*—Jon E. Hokanson
*Attorney, Agent, or Firm*—Wayne H. Lang

[57] ABSTRACT

Centrifugal separating apparatus comprising a concentric inner and outer housing enclosing a swirling chamber through which a steam-water mixture is directed to separate the water from the steam. The inner housing encloses a first set of vanes that impart a rotary movement to the steam-water mixture accompanied by a centrifugal action sufficient to separate water from the steam and move it outward through perforations in the inner housing. A second set of inclined vanes in the space between the inner and outer housing members serve to swirl the water and remove residual steam therefrom before it is recirculated.

9 Claims, 3 Drawing Figures

APPARATUS FOR SEPARATING WATER AND STEAM IN A NUCLEAR STEAM GENERATOR

BACKGROUND OF THE INVENTION

Steam-water separators remove water from steam in order that steam leaving the separator be made as "dry" as possible before the steam is directed to its place of use. A steam-water separator commonly used comprises a vertical housing or "can" body having spiral vanes positioned at one end whereby a mixture of steam-water entering therein is imparted a spinning action sufficient to force the heavier liquid phase of the mixture to be thrown outward away from the lighter phase of the mixture. Theoretically, separation is complete when the liquid is once removed from the gas. It has, however, been observed that if water from which all steam has been removed is directed through a space containing steam or other gas, the water again entrains some steam therein. Therefore, it is an object of this invention to separate steam from water entrained therein, to prevent reentrainment of steam in the water, and should re-entrainment occur, provide further separation of steam from the water.

SUMMARY OF THE INVENTION

The steam-water separator of the present invention provides a conventional separating device having a set of primary separating vanes with a unique set of secondary vanes that remove re-entrained or "carry-under" steam from water that has been once subjected to the primary vanes.

The novel separating device of the present invention comprises essentially a pair of upright cylindrical housing members or "cans" having an inlet end at the bottom thereof for a steam-water mixture. Fluid spinning apparatus disposed adjacent the inlet end thereof is adapted to impart a rotary movement of high velocity to the steam-water mixture entering the "cans". Due to the rotary movement and the resulting centrifugal action, the heavier liquid and any particulate matter entrained therein is moved outward against the inner surface of the separator by centrifugal action, while the lighter vapor or steam continues to flow axially through the central region of the "cans" and then be discharged from a central opening therein.

The inner housing member encloses an inner chamber that is perforated with a plurality of radially disposed openings whereby the heavier liquid may flow radially therethrough to the annular space between concentric housing members of the separator, while the essentially "dry" gas phase or steam is permitted to flow in a generally axial direction to the outlet.

As the water flows into the annular space between concentric housing members, it descends to the bottom of the separator before it is eventually removed therefrom. Inasmuch as the space between housing members is usually occupied by a gaseous phase of the separated steam-water mixture, the water flowing therethrough re-entrains some of the gas to negate the separation originally accomplished in the inner chamber by the centrifugal action of the spinner vanes.

When steam is re-entrained in water the volume of the water is increased an amount that varies with the amount of entrained steam. Therefore, the re-entrainment of varying amounts of gaseous steam in the water results in varying conditions that cause unstable operation. Moreover, the inclusion of steam in the water increases the likelihood of additional corrosion when the steam-water mixture contacts the metallic parts of the separator.

Therefore, according to this invention, the annular chamber between concentric housing members is adapted to contain a quantity of water whereby water separated from steam may escape into a water environment to preclude further entrainment of steam. Moreover, as the water which has already been separated from the steam descends through the annular chamber between housing members, it passes additional vanes that impart a rotary motion thereto while they shield ports that permit residual gas therein to escape and move into a gaseous environment. Steam separated from water according to this invention is therefore free of entrained water, while water is free of entrained steam.

BRIEF DESCRIPTION OF THE DRAWING

A more complete understanding of my invention may be had by referring to the drawing in which.

DESCRIPTION OF THE PREFERRED EMBODIMENT

Figure 1:
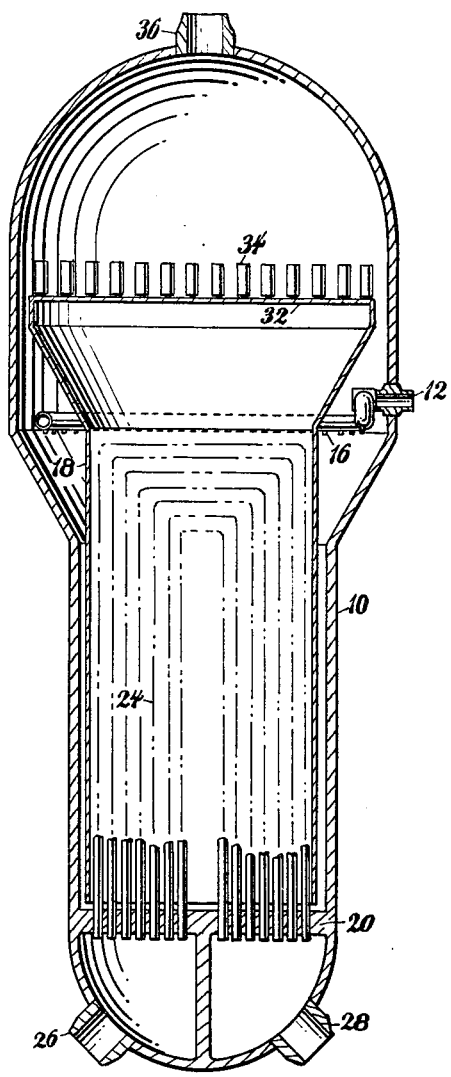
FIG. 1 is a vertical section of a shell and tube type vapor generator having a steam-water separator constructed in accordance with the present invention.

With reference now to FIG. 1 of the drawing, reference numeral 10 indicates the outer housing of a shell and tube type steam generator. Feedwater enters the generator through inlet 12 and flows into the annular ring distribution header 14 where it is discharged downward through a plurality of distribution openings 16. The water flows downwardly between an annular shroud 18 and the walls of vessel 10 to end plate 20 where the water enters the central chamber and flows over tubes 24 to be heated thereby.

The heating medium enters tubes 24 through inlet 26, and after traversing inverted "U"-tubes 24 is exhausted through an outlet 28. The water surrounding tubes 24 is accordingly heated by the hot water circulating through the tubes and is changed into steam. As the steam rises it traverses openings in plate 32 and flows through the several individual separators 34 which effectively remove residual water from the steam. The steam continues to rise and be discharged through an outlet port 36 while the water removed therefrom descends over the edge of plate 32 into the annular space between the vessel wall and shroud 18 to be again vaporized when placed in contact with tubes 24.

Each steam generator includes an array of identical separators 34 disposed about the upper side of plate 32, the details of which are further defined in the accompanying specification.

Figure 2:
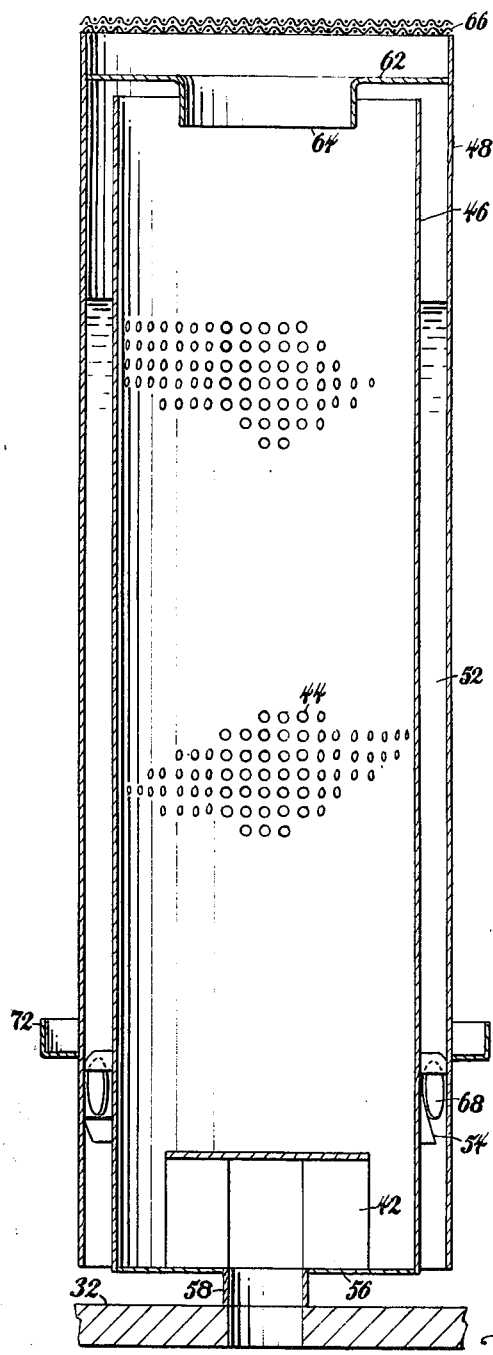
FIG 2 is a vertical section as seen from lines 2—2 of FIG. 1.
Figure 3:
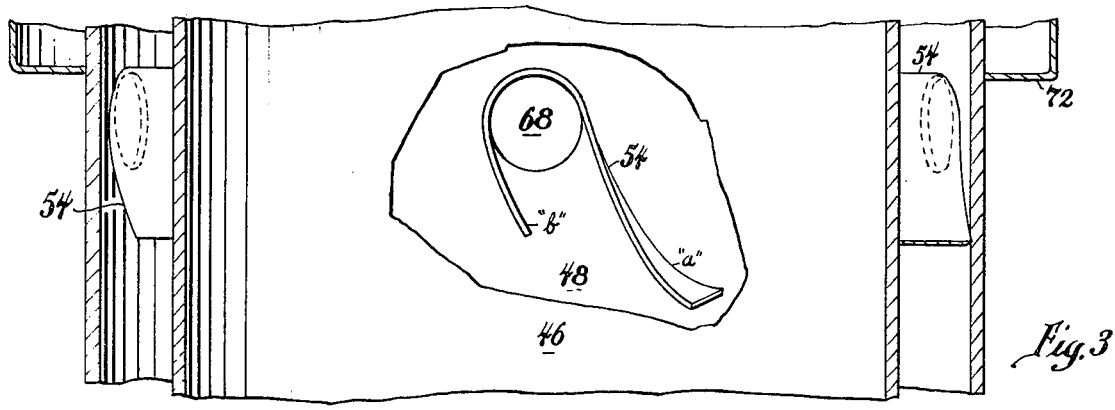
FIG. 3 is an enlarged view of the secondary vanes of the separator.

Looking now to FIG. 2 we see the details of a separator assembly that is positioned over each opening in plate 32. The steam-water mixture passing upward through an opening in plate 32 encounters spinning vanes 42 that are disposed radially outward. As the steam moves spirally, centrifugal force imparted to the droplets of water causes them to move radially outward through openings 44 in the inner shell or "can" 46. The inner shell 46 is concentrically spaced within the outer shell 48 to form an annular space 52 therebetween.

After the water reaches openings 44 and is forced radially therethrough, it impinges upon the wall of housing 48 and thence descends to plate 32. To direct the downward flow of water in annular chamber 52, the chamber is provided with a series of generally axially disposed vanes 54 that extend between inner shell 46 and outer shell 48. The vanes 54 are firmly affixed to the spaced shells to provide means by which the outer shell is supported from the inner shell, while the inner shell 46 is supported from an annular plate 56 on cylindrical housing 58 that surrounds each opening in the plate 32.

An annular plate 62 inboard from the outlet end of outer housing 48 has a cylindrical portion 64 that extends axially to limit flow therethrough to substantially water-free steam, while heavier particles move outward between plate 62 and the end of housing 46. A screen 66 across the outlet end of outer shell 48 serves as a contacting medium for residual water that is entrained in the steam. As water in the steam contacts the screen, it clings thereto and is forced outward to the outer periphery thereof before it falls over the outer surface of "can" 48.

The vanes 54 are each "U"-shaped and somewhat inclined from the vertical to form a forward leaf "a" and an aft leaf "b". The length of the forward leaf "a" exceeds the length of the aft leaf "b" by a non-critical proportion of approximately 2:1. Leaf "a" is connected to leaf "b" by an arcuate segment or bight that encircles opening 68 formed in the outer housing 48 whereby residual steam removed from the water by vanes 54 may flow past the shorter leaf "b" and be exhausted through opening 68. This steam then joins with the "dry" steam exhausting upward through annular plate 62, while the essentially steam-free water flows over plate 32 for recirculation through the steam generator.

Residual water removed from the steam by screen 66 is carried out to the periphery thereof by the action of the steam flowing through cylinder 64. As the water reaches the outer periphery of the screen it cascades down around the outer surface of housing 48 to join the water from annular chamber 52 that is being discharged over the upper surface of plate 32.

To preclude interaction between steam-free water cascading down over the outer surface of "can" 48 and water-free or "dry" steam that is escaping out opening 68, a trough-like segment 72 or canopy is placed above each opening 68 to direct the water laterally. Thus the water continues to flow downwardly over the "can" 48, while the steam from opening 68 may ascend to join with steam from within the "can" 46 before it is exhausted through outlet 36.

I claim:

1. A steam-water separator that comprises in combination an outer cylindrical housing disposed in an axially upright position, a perforate housing concentrically aligned within the outer housing having axially disposed inlet and outlet ports at opposite ends thereof arranged to provide an annular space between inner and outer housing members, spinner vanes in the inlet port of the perforate housing adapted to subject fluid flowing axially therethrough to a rotary movement that imparts centrifugal force to said liquid sufficient to move the liquid radially through the perforations of the inner housing while the steam continues to flow axially to said outlet port, inclined spinner vanes that comprise forward and aft leaves joined by a continuous bight in the annular space between inner and outer housing members for imparting a rotary movement to the water flowing therethrough, and apertures in the outer housing wall for venting residual steam radially therethrough after it has been separated from water by passing over the vanes in the annular space between housing members.

2. A steam-water separator as defined in claim 1 wherein the free area of the perforations of said inner housing is greater than the free area between spinner vanes in the annular space whereby downward fluid flow therethrough is restricted to provide a water environment in the annular space.

3. A steam-water separator as defined in claim 1 wherein the inclined leaves are disposed in a parallel relationship.

4. A steam-water separator as defined in claim 1 wherein the inclined leaves of each vane are of unequal length.

5. A steam-water separator as defined in claim 4 wherein the forward leaf of each vane is substantially longer than the aft leaf.

6. A steam-water separator as defined in claim 5 wherein the apertures for venting steam from the annular space between housing members are positioned within the bight of each spinner vane.

7. A steam-water separator as defined in claim 6 having screen means covering the axially disposed outlet ports of said concentric housing members adapted to contact water in said steam and direct it radially to the periphery of said housing members.

8. A steam-water separator as defined in claim 7 wherein the screen means covering the outlet ports is normal to the concentric housing members.

9. A steam-water separator as defined in claim 8 including a weir over each aperture in the outer housing adapted to preclude the re-entrainment of water in steam escaping through each port.

* * * * *